(12) United States Patent
Pond et al.

(10) Patent No.: US 6,654,172 B2
(45) Date of Patent: Nov. 25, 2003

(54) COMBINED STOP/TURN/TAIL/CLEARANCE LAMP USING LIGHT EMITTING DIODE TECHNOLOGY

(75) Inventors: Gregory Pond, Jamestown, NY (US); Phillip C. Roller, Ashville, NY (US)

(73) Assignee: Truck-Lite Co., Inc., Falconer, NY (US)

( * ) Notice: Subject to any disclaimer, the term of this patent is extended or adjusted under 35 U.S.C. 154(b) by 0 days.

(21) Appl. No.: 09/943,989

(22) Filed: Aug. 31, 2001

(65) Prior Publication Data

US 2002/0024822 A1 Feb. 28, 2002

Related U.S. Application Data

(60) Provisional application No. 60/229,229, filed on Aug. 31, 2000.

(51) Int. Cl.[7] ............................................. G02B 27/10
(52) U.S. Cl. .................. 359/619; 359/742; 359/743
(58) Field of Search ................................. 359/619, 618, 359/455, 454, 642, 727, 726, 737, 733, 742, 743; 362/800, 555, 545, 544, 439; 348/801

(56) References Cited

U.S. PATENT DOCUMENTS

| | | | |
|---|---|---|---|
| 2,254,961 A | 9/1941 | Harris | 240/106.1 |
| 2,254,962 A | 9/1941 | Harris et al. | 240/106.1 |
| 3,633,022 A | 1/1972 | Sassmanashausen | 240/8.3 |
| D248,591 S | 7/1978 | Urbanek | D48/32 |
| D248,690 S | 7/1978 | Nagel | D48/32 |
| 4,120,018 A | 10/1978 | Nagel | 362/333 |
| 4,153,928 A | 5/1979 | Speedy | 362/331 |
| 5,008,718 A | 4/1991 | Fletcher et al. | 357/17 |
| 5,013,144 A | 5/1991 | Silverglate et al. | 359/709 |
| 5,359,209 A | 10/1994 | Huang | 257/94 |
| 5,404,282 A | 4/1995 | Klinke et al. | 362/249 |
| 5,519,596 A | 5/1996 | Woolverton | 362/250 |
| D372,317 S | 7/1996 | Kijima | D26/28 |
| 5,588,743 A | 12/1996 | Mayo et al. | 362/299 |
| 5,692,827 A | 12/1997 | Chinniah et al. | 362/336 |
| 5,765,940 A | 6/1998 | Levy et al. | 362/240 |
| 5,856,833 A | * 1/1999 | Elgee et al. | 347/19 |
| 5,896,093 A | 4/1999 | Sjoborn | 340/815.75 |
| 5,936,353 A | 8/1999 | Triner et al. | 315/112 |
| 5,954,427 A | 9/1999 | Campos et al. | 362/517 |
| 6,079,854 A | 6/2000 | Ra | 362/342 |

OTHER PUBLICATIONS

Differences between the SnapLED 150 and Super Flux/ SnapLED products. (1999) Application Note 1177 Hewlett–Packard.

Advantages of SnapLED 150 LED product compared to other lighting technologies in Automotive signal lamps. (Jul. 1999) Application Note 1176 Hewlett–Packard.

James W. Stewart, HP Snap LED: LED Assemblies for automotive signal lighting (Nov. 1, 1998) The Hewlett–Packard Journal. vol 50: No 1: Article 1.

* cited by examiner

Primary Examiner—Jordan M. Schwartz
Assistant Examiner—Jessica Stultz
(74) Attorney, Agent, or Firm—The Bilicki Law Firm, P.C.

(57) ABSTRACT

A tail/stop lamp assembly is disclosed that uses as a light source light emitting diodes, specifically SnapLEDs™. The tail/stop lamp assembly is composed of housing, a lens, and a SnapLED™ array. The lens is composed of six different optical units surrounded by Fresnel rings. The housing is of a very slim design. The combination of optics and housing is a stylish, sturdy and efficient tail/stop lamp assembly that complies with Society of Automotive Engineers (SAE) standards.

10 Claims, 4 Drawing Sheets

COMBINED STOP/TURN/TAIL/CLEARANCE LAMP USING LIGHT EMITTING DIODE TECHNOLOGY

PRIORITY STATEMENT

This application claims the benefit of U.S. Provisional Application No. 60/229,229 filed Aug. 31, 2000, which is incorporated herein by reference.

FIELD OF THE INVENTION

The present invention relates to a light emitting diode (LED) vehicular lamp. In particular, the invention describes a combined stop/turn/tail/clearance light assembly, which utilizes light emitting diode technology as the light source.

BRIEF DESCRIPTION OF THE DRAWINGS

Other aspects, objects, and advantages of the present invention appear more clearly on reading the following best mode for carrying out the invention, given by way of example and made with reference to the accompanying drawings, in which.

DETAILED DESCRIPTION OF THE DRAWINGS

Figure 1:
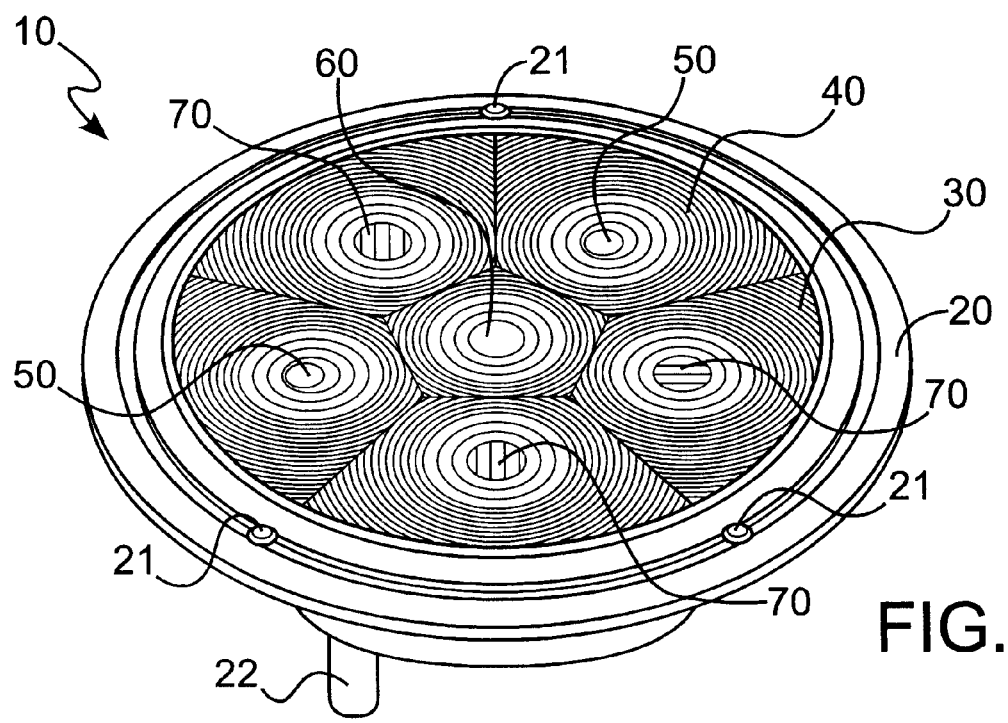
FIG. 1 is a three-dimensional view of one embodiment of the present invention.

For the purpose of promoting an understanding of the present invention, reference will be made to an embodiment of a circular stop/tail/turn/clearance lamp as illustrated in the drawings. It will nevertheless be understood that no limitations of the scope of the invention is thereby intended, such alterations as changing the geometry of the invention or changing the placement of the various optical elements of the lens could provide additional alterations which would fall within the spirit and scope of the invention described herein. Some of the possible alterations will be mentioned in the following description.

With particular reference to the drawings, the reader should understand that like numerals in different figures refer to the same elements of the invention.

FIG. 1 shows a three-dimensional view of lamp 10, one embodiment of the present invention. Lamp 10 is comprised of housing 20, flexible metal support 80 (not shown), light emitting diodes 100 (not shown), printed circuit board 90 (not shown), and lens 30. In the embodiment shown in FIG. 1, lamp 10, including lens 30 and housing 20, is substantially circular in shape to function as a combined stop/tail/turn/clearance lamp. Moreover, housing 20 has a flange to provide strength, protection and support to lens 30 and lamp 10.

Referring to FIG. 1, housing 20 contains a plurality of holes 21 for receiving fasteners for fixedly securing lamp 10 to a vehicle. However, one of ordinary skill in the art will readily appreciate that lamp 10 can be secured to vehicle by a variety of means well know in the art. Housing 20 also possesses plug 22 that mates with a vehicle to connect lamp 10 to the electrical system of the vehicle. Lens 30 is substantially flush with housing 20.

Figure 2:
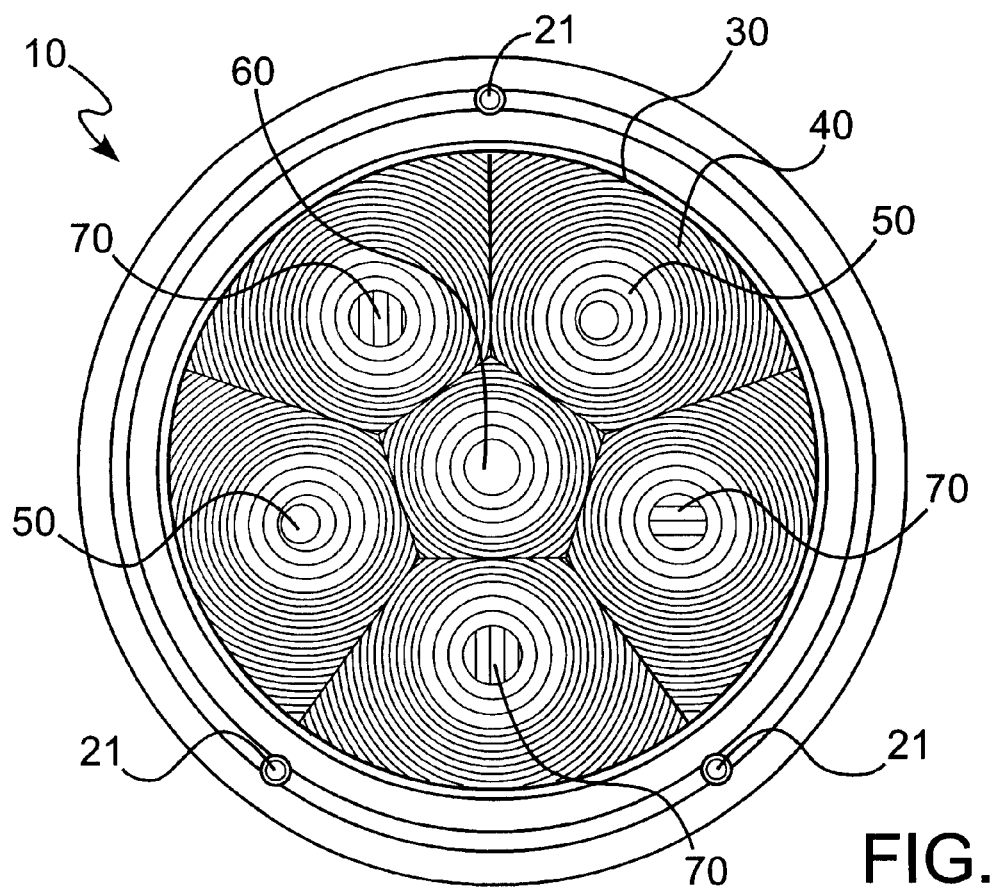
FIG. 2 is a top view of one embodiment of the present invention.

FIG. 2 is a top plan view of lamp 10. As shown in FIG. 1 and FIG. 2, lens 30 comprises a combination of a first optical element 60, a second optical element 70, and a third optical element 50. Lens 30 has a face and a back. The face of lens 30 is smooth and is exposed to the environment when lamp 10 is assembled. As further shown in FIG. 1 and FIG. 2, a fourth optical element, Fresnel rings 40, surround each of the optical elements 50, 60 and 70. Fresnel rings 40 are formed as tiny grooves on the back of lens 30. Fresnel rings 40 function as refracting surfaces, sending parallel rays of light emitted from the light emitting diodes to a common focus.

Figure 3A:
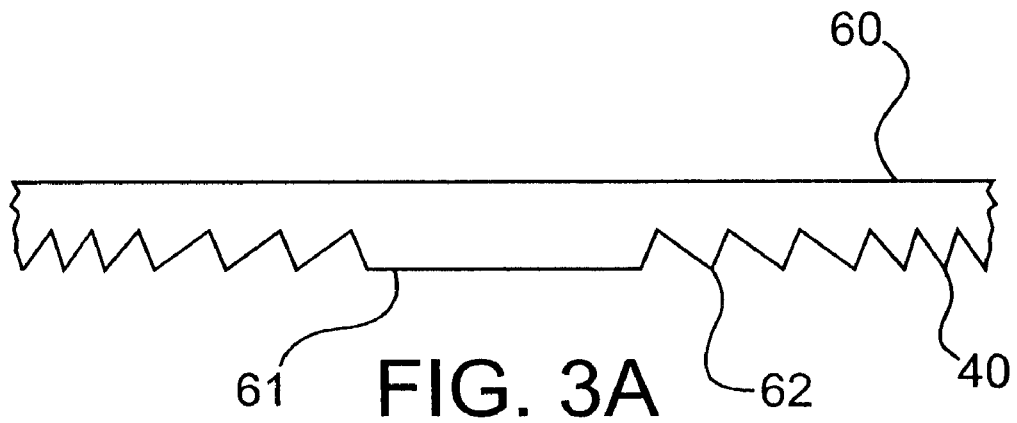
FIGS. 3A, 3B, and 3C are cross sectional views of the various optical elements that are utilized in one embodiment of the present invention.
Figure 3B:
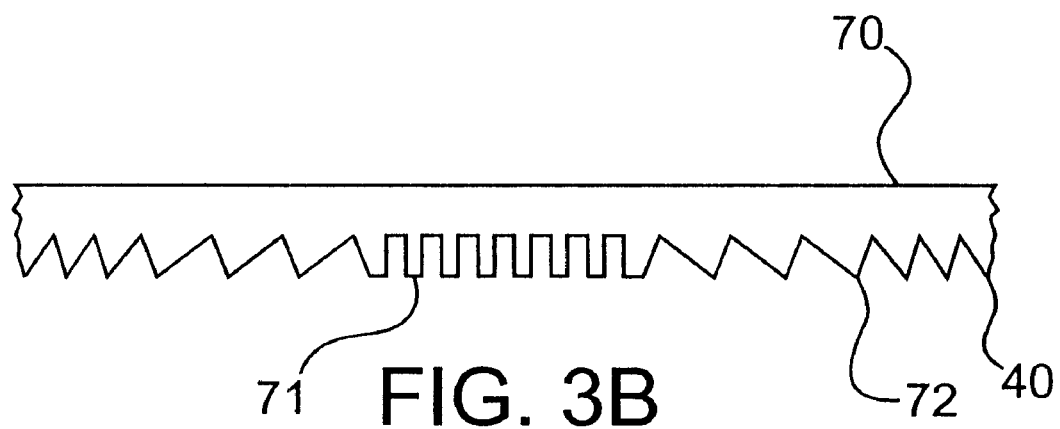
Figure 3C:
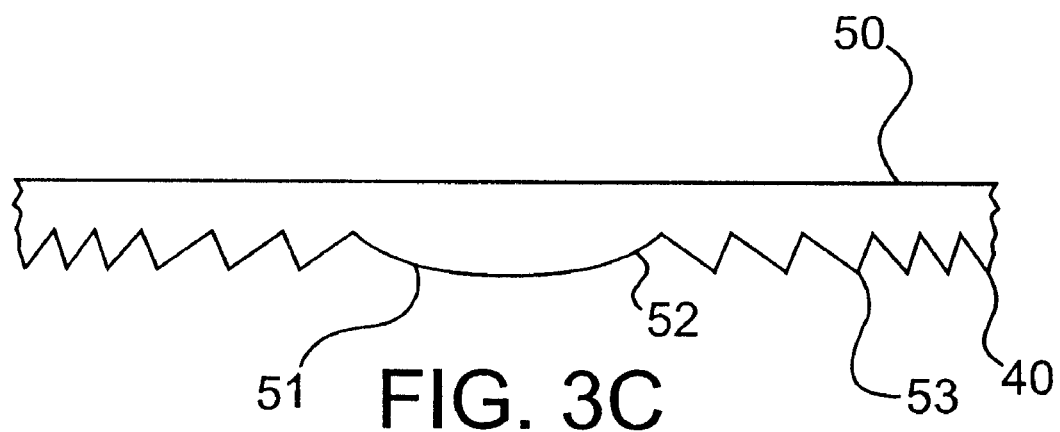

As discussed above, lens 30 comprises a first, second and third optical element in addition to Fresnel rings 40. The first, second and third optical elements are generally shown in FIGS. 1 and 2, while a detailed cross-section is shown in FIGS. 3A, 3B, and 3C. First optical element 60, as shown in FIG. 3A, has a planar surface 61 at the center. Planar surface 61 is textured to randomly scatter light emitted from light emitting diodes 100. A plurality of rounded-off wedges 62, spaced slightly apart, surround first optical element 60, before Fresnel rings 40 begin. Rounded-off wedges 62 spread the substantially parallel light emitted from the light emitting diodes out as far as forty-five (45) degrees to the left and to the right. Surrounding rounded-off wedges 62 is a set of Fresnel rings 40.

Second optical element 70, as shown in FIG. 3B, has grooves 71 cut into the center of the optical element. Grooves 71 refract the substantially parallel light emitted from light emitting diodes 100 to the right and left approximately forty-five (45) degrees. Rounded-off wedges 72 surround second optical element 70. Rounded-off wedges 72 function to spread the light further to the right and to the left. Surrounding rounded-off wedges 72 are Fresnel rings 40.

Third optical element 50, shown in FIG. 3C, has convex portion 51 which originates from one of rounded-off wedges 53 and curves to the center of optical element 50. Flat portion 52 meets convex portion 51 and joins rounded-off wedges 53. Flat portion 52 and convex portion 51 of optical element 50 are textured to scatter light emitted from light emitting diodes 100 randomly. Rounded-off wedges 53 surrounding optical element 50 spread the substantially parallel light emitted from light emitting diodes 100 out as far as forty-five (45) degrees to the left and to the right. Surrounding wedges 53 are Fresnel rings 40.

Figure 4:
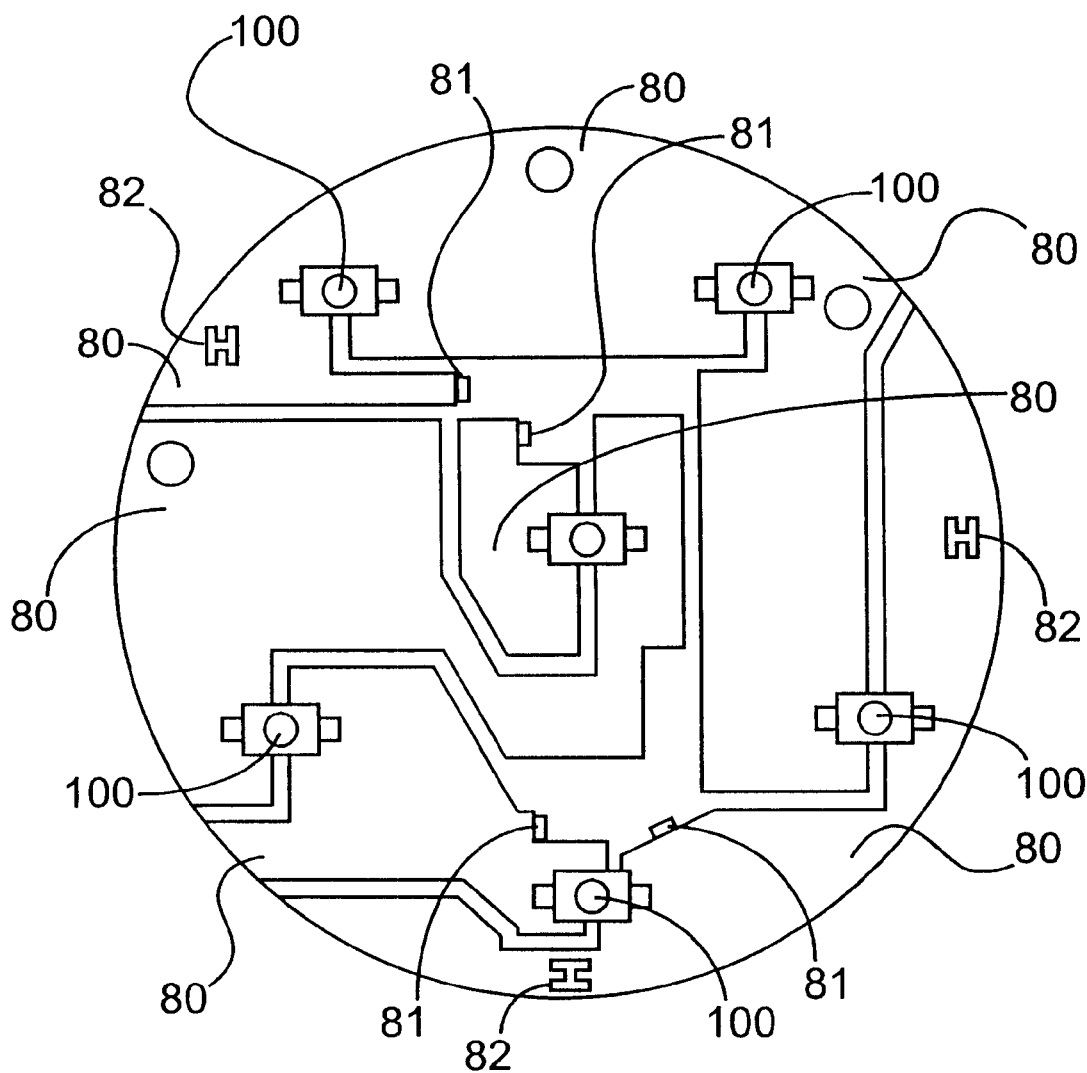
FIG. 4 depicts a top view of the SnapLED™ diode array, utilized in one embodiment of the invention.

FIG. 4 illustrates a top view of the light emitting diode array utilized in one embodiment of the invention. In the embodiment shown here, a plurality of light emitting diodes, such as those manufactured by Hewlett Packard and marked with the SnapLED™ trademark, are mounted to a flexible substrate through the use of a patented solderless, clinch technology, such as described in U.S. Pat. Nos. 5,519,596 and 5,404,282. Moreover, in this embodiment, the drive circuit of a SnapLED™ diode array is mounted remotely, such as in the wire harness or on a remote printed circuit board. As a result, the heat generated by the drive circuit from the light emitting diode array is isolated.

As is shown in FIG. 4, one embodiment of the invention utilizes six light emitting diodes 100. It should be understood that any number of light emitting diodes can be used, depending on the standards or specifications one attempts to meet. In the embodiment of the invention shown here, lamp 10 satisfies Society of Automotive Engineers Standards J585e (September 1997), J1398 (May 1995), and J592e (July 1972), as adopted by the U.S. Department of Transportation.

Referring to FIGS. 1–2, and 4, the center of each optical element 50, 60 and 70 is positioned above one of light emitting diodes 100. Thus, in the embodiment shown in FIGS. 1–2, and 4, six optical elements, chosen from the first three types of optical elements are utilized. With the optical arrangement described below, the SnapLED™ diode array does not have to be aligned in an exact position. Thus, the SnapLED™ diode array can move around slightly, while not affecting the distribution and intensity of the light emitted from the lamp.

In the embodiment depicted in FIGS. 1–2, the arrangement of the first, second and third optical elements is as follows: First optical element 60 is positioned in the center of lens 30. Surrounding first optical element 60, five optical elements are positioned around the periphery of lens 30. Referring to FIG. 2, one of third optical element 50 is positioned in the upper right corner, toward the outer edge of lens 30. Proceeding clockwise, one of second optical element 70 is positioned toward the outer edge of lens 30 with grooves 71 oriented substantially in the horizontal direction. Moving clockwise, one of second optical element 70 is positioned toward the outer edge of lens 30. This second optical element 70 is, however, rotated ninety (90) degrees such that grooves 71 are oriented substantially vertical in a direction perpendicular to that of the adjacent second optical element 70. Moving clockwise, one of third optical element 50 is positioned toward the outer edge of lens 30. Finally, moving clockwise, one of second optical element 70 is positioned toward the outer edge of lens 30 and oriented substantially vertical.

FIG. 4 depicts a top view of the SnapLED™ diode array including flexible metal supports 80, light emitting diodes 100, attachment posts 81, and mounting tab 82. Mounting tabs 82 are used to secure flexible supports 80 to housing 20 through one-way mounting terminals on housing 20. Because the mounting terminals are one-way terminals, flexible metal supports 80 cannot be removed without destroying the mounting terminals and mounting tabs 82.

Attachment posts 81 of flexible metal supports 80 are also connected to one-way attachment terminals on printed circuit board 90. Again, once attachment posts 81 are connected, they cannot be removed without destroying the terminals or the posts. It should be understood that any type of printed circuit board can be used with this invention; however, the attachment terminals must be embedded in the board.

Figure 5:
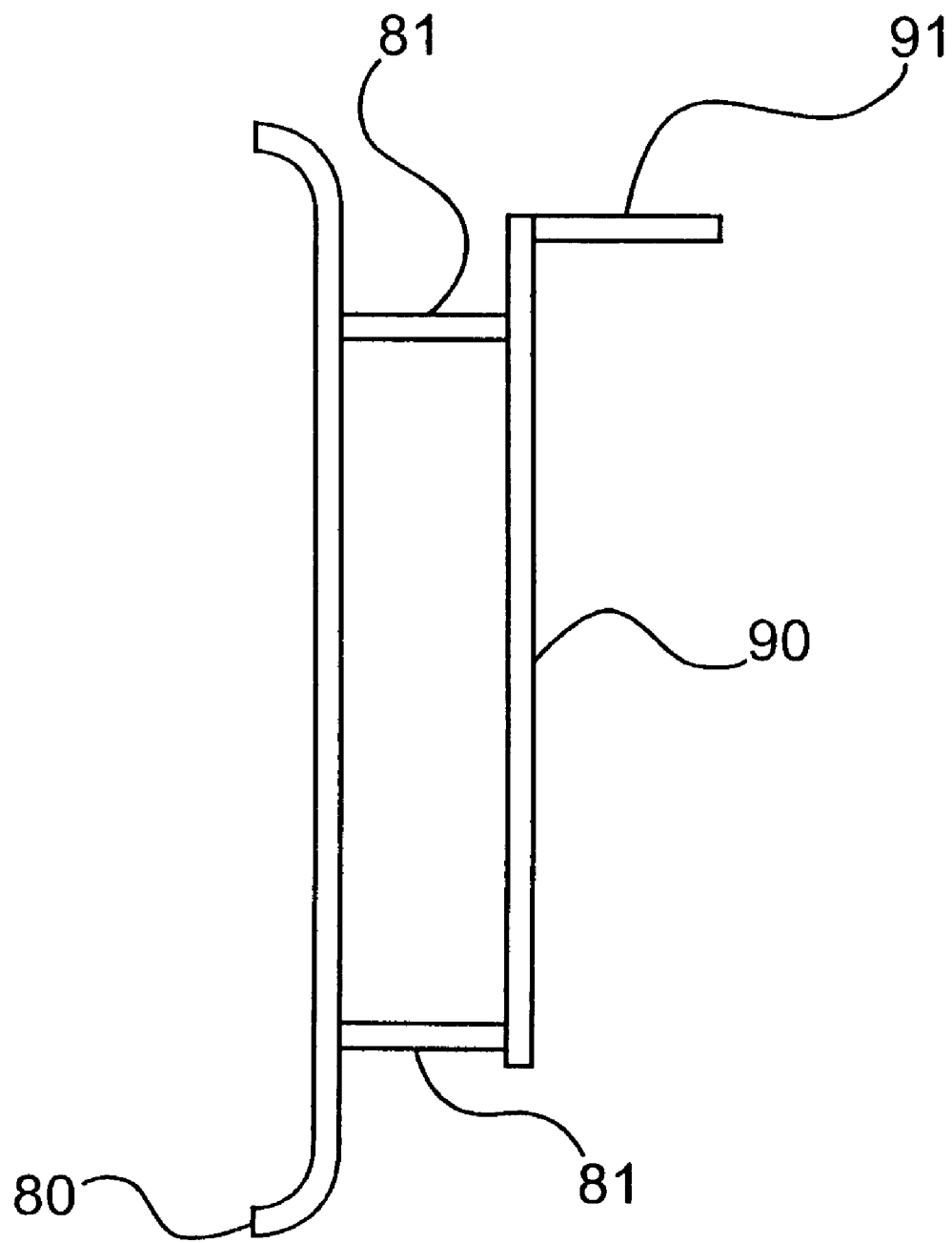
FIG. 5 depicts a side view of the SnapLED™ diode array connected to the printed circuit board as utilized in one embodiment of the invention.

FIG. 5 depicts flexible metal supports 80 on which are mounted light emitting diodes 100. FIG. 5 also depicts attachment posts 81 that form the connection between flexible metal supports 80 and printed circuit board 90. In addition, FIG. 5 shows mounting posts 91 that are used to attach printed circuit board 90 to the electrical connections of a vehicle.

In the embodiment shown here, the SnapLED™ diode array is embedded with a potting compound, such as an epoxy resin. Embedding the SnapLED™ diode array provides stability when lamp 10 is subject to mechanical vibrations that may result during operation of a vehicle, protects the diode array from corrosion, and helps to prevent unwanted electrical connections from forming in the spaces between flexible metal supports 80.

The description and drawings presented above is not intended to demonstrate all of the possible arrangements and modifications to this design. For those skilled in the art, changes will be apparent that will fall within the scope of the present invention.

What is claimed:

1. A lamp assembly comprising:
   a housing;
   a printed circuit board;
   a flexible support operatively connected to said printed circuit board;
   at least one light emitting diode operatively connected to said flexible support; and,
   a lens for transmitting light from said at least one light emitting diode, said lens having,
      a first optical element to scatter said light;
      a second optical element to spread said light at an angle substantially 45° to the left and right of the longitudinal axis of said at least one light emitting diode; and,
      a third optical element to scatter said light.

2. A lamp assembly according to claim 1 further comprising potting material covering the flexible support and at least part of said at least one light emitting diode.

3. A lamp assembly according to claim 2 wherein said potting material is an epoxy.

4. A lamp assembly according to claim 1 further comprising a flange to permit mounting of said assembly.

5. A lamp assembly according to claim 4 wherein said flange is adapted to receive a fastener.

6. A lamp assembly comprising:
   a housing;
   a printed circuit board;
   a flexible support operatively connected to said printed circuit board;
   at least one light emitting diode operatively connected to said flexible support; and,
   a lens for transmitting light from said at least one light emitting diode, said lens having,
      a first optical element to scatter said light;
      a second optical element to spread said light at an angle substantially 45° to the left and right of the longitudinal axis of said at least one light emitting diode;
      a third optical element to scatter said light; and,
      a fourth optical element to refract said light into a common focus.

7. A lamp assembly according to claim 6 further comprising potting material covering the flexible support and at least part of said at least one light emitting diode.

8. A lamp assembly according to claim 7 wherein said potting material is an epoxy.

9. A lamp assembly according to claim 6 further comprising a flange to permit mounting of said assembly.

10. A lamp assembly according to claim 9 wherein said flange is adapted to receive a fastener.

* * * * *